Figure 1:
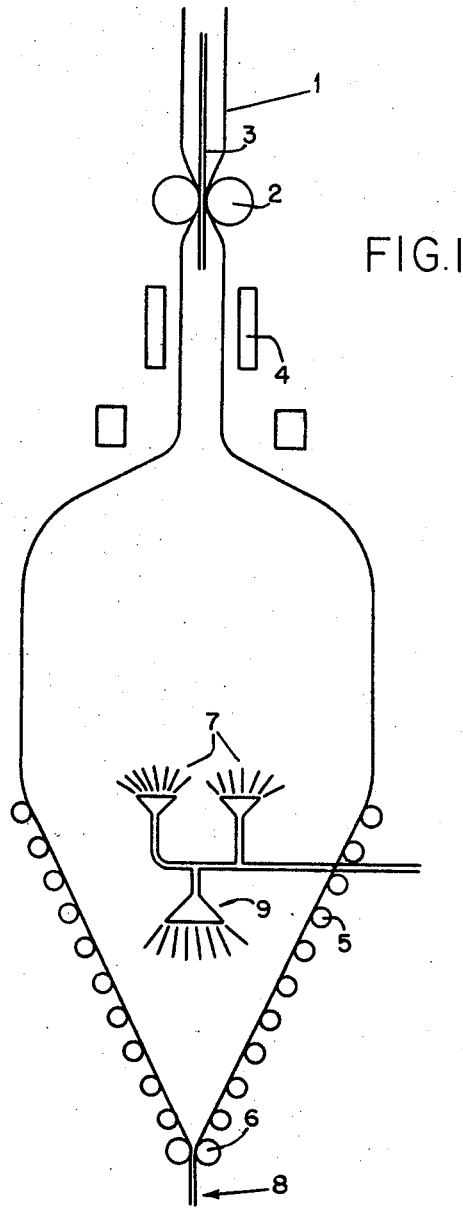

Feb. 16, 1965     J. W. STINCHCOMBE     3,170,012

PROCESS OF REDUCING SAG IN TUBULAR FILM MANUFACTURE

Filed July 12, 1962

INVENTOR
JOHN WRIGHT STINCHCOMBE

BY Cushman, Darby & Cushman
ATTORNEYS 3,170,012
PROCESS OF REDUCING SAG IN TUBULAR
FILM MANUFACTURE
John Wright Stinchcombe, Welwyn, England, assignor to Imperial Chemical Industries Limited, London, England, a corporation of Great Britain
Filed July 12, 1962, Ser. No. 209,459
Claims priority, application Great Britain, July 12, 1961, 25,256/61
9 Claims. (Cl. 264—95)

This invention relates to the manufacture of thermoplastic film by the tubular process and in particular it relates to such manufacture of biaxially oriented thermoplastic films, for instance to the manufacture of biaxially oriented linear polyolefine films and linear polyester films, e.g. those of linear polythene, polypropylene, polybutene-1, poly-4-methyl pentene-1 and linear terephthalate esters such as polyethylene terephthalate.

A problem which arises in such manufacture is that when the bubble of expanded film is collapsed to produce a layflat or slit film, the path length differences resulting from the geometry of the collapsing process cause differential stretching around the bubble where it is hot enough to stretch and this results in longitudinal length variations, or "sag." Normally the bubble after heating and stretching is collapsed by V-section guides of rollers and we observed that where the rollers do not contact the film, it remains hotter than where the film is in contact with the rollers. We have found that if the bubble is cooled where it does not contact the guide rollers, the "sag" is reduced, and particularly is reduced at the edges of the layflat film produced. This is of importance because film which sags at the edges is difficult to handle or wind onto rollers and is difficult to slit satisfactorily since the regions of "sag" tend to form creases which cause tears when slitting. A similar improvement is obtained when film is heat set in a tubular state and is collapsed to layflat film by guide rollers.

The invention consists, therefore, in a process of tubular film manufacture wherein a thermoplastic tube (or bubble) of film is heated and then collapsed to a layflat film by V-section guides, the film, before it is completely collapsed, being cooled in zones thereof where it does not contact the guides, said zones being near to where edges will be formed in the film when it becomes completely collapsed, whereby "sag" is reduced.

As a refinement it is preferred to cool the film to the greatest extent according to the present invention in two parallel zones on either side of where an edge will be formed in the film when it becomes completely collapsed. The reason for applying maximum cooling in such parallel zones will become apparent from a study of the "sag" curve referred to below.

Figure 2:
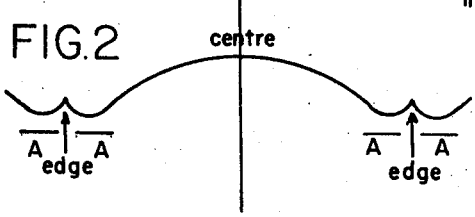

The manufacture of a biaxially oriented tubular film of polypropylene is now described by way of example with reference to the accompanying drawings in which:

FIGURE 1 shows a diagrammatic set-up for operating the process of the invention, and FIGURE 2 shows the curve of "sag" expressed as a percentage length variation plotted against the circumferential position on the bubble of film, the distance between the two edges indicated by arrows in the drawings representing half the circumference of the film.

In FIGURE 1, a tube of polypropylene 1 is passed downwards between nip rollers 2 through which inflating air is admitted through a probe 3 passing between sponge rubber sections of the nip rollers (see British specification No. 787,479). The tube is heated to a stretching temperature by infra-red heaters 4, is stretched and is then collapsed by V-sectioned guide rollers 5 and hauled off by nip rollers 6. As the bubble of film is collapsed, it is cooled by jets of air arranged in pairs and directed towards the external surface of the film on either side of where an edge will be formed in the lay-flat film issuing from the nip rollers 6. The jets of air 7 cool the film at zones corresponding to zones identified as A on the "sag" curve shown in FIGURE 2. A further, wider, jet 9 lower down the guides, cools the film over a wider zone extending across that part of the incompletely collapsed film which becomes one edge of the lay-flat film. This ensures that the film temperature around the bubble remains fairly constant despite the cooling effect of the V-section guides 5.

After issuing at 8 from the nip rollers 6, the film is normally slit at one or both edges and reeled up onto rollers, after opening out a singly slit film to a double width as necessary.

The cooling means is preferably air directed at the zones of film to be cooled but other means such as plates or rollers in contact with the film could be used. The cooling is preferably applied near to where the tube enters the V-section guides but could be in advance of this position, or, with less effect, in retard of it.

In a preferred way of working, in addition to being cooled according to my invention the tube of film is further cooled before it is completely collapsed, over a relatively wide zone extending across where an edge will be formed in the film when it becomes completely collapsed.

Although my invention is applicable to cooling biaxially oriented thermoplastic films generally, e.g. those of linear polyesters such as polyethylene terephthalate, it is particularly useful when the film is composed of linear polyolefines such as linear polythene, polybutene-1 and poly-4-methyl-pentene-1, especially polypropylene.

The cooling step according to my invention may be applied to un-heat set film, before it has been completely collapsed by V-section guides, immediately after the tube of film has been heated to cause biaxial orientation or, alternatively, it may be applied to heat set biaxially oriented film, before it has been completely collapsed by V-section guides, immediately after the biaxially oriented film has been heated to cause heat setting thereof. The terms "heat set" and "heat setting" as used in the present specification have their usual meaning in the art, namely they are applied to tubular film and to the process of making such film, respectively, which has been crystallised after being biaxially oriented and has lower shrinkage at elevated temperatures than the un-heat set film.

In one preferred way of working my invention the tube of film is cooled after it has been heated to a temperature below its softening point which is suitable for orientation and is stretched by inflation to biaxially orient it, but before the stretched film thereby produced has been completely collapsed by the V-section guides to a lay-flat film. For example, the tube of film may be inflated by advancing it downwards between the nip of a first pair of nip rollers, gas admitted under pressure within the tube while it is heated to a temperature suitable for orientation after its passage through the nip of said first pair of rollers, the stretched film cooled according to my invention, collapsed by the V-section guides, and the collapsed film withdrawn through the nip of a second pair of nip rollers. Conveniently the inflating gas is admitted under pressure through at least one probe passing through the nip of the first pair of rollers.

I claim:
1. In a process of tubular film manufacture wherein a thermoplastic tube of film is heated and then collapsed to a lay-flat film by V-section guides, the improvement wherein the film, before it is completely collapsed, is cooled in zones thereof where it does not contact the guides, said zones being near to where edges will be formed in the film when it becomes completely collapsed.

2. A process according to claim 1 wherein the tube of film is cooled to the greatest extent in two parallel zones on either side of where an edge will be formed in the film when it becomes completely collapsed.

3. A process according to claim 1 wherein the film is cooled near to where the tube enters the V-section guides.

4. A process according to claim 1 wherein the tube of film is additionally cooled before it is completely collapsed, over a relatively wide zone extending across where an edge will be formed in the film when it becomes completely collapsed.

5. A process according to claim 1 wherein cooling is effected by air directed at the zones of film to be cooled.

6. A process according to claim 1 wherein the tube of film is cooled after it has been heated to a temperature below its softening point which is suitable for orientation and is stretched by inflation to biaxially orient it, but before the stretched film thereby produced has been completely collapsed by the V-section guides to a lay-flat film.

7. A process according to claim 6 wherein the tube of film is inflated by advancing it downwards between the nip of a first pair of nip rollers, admitting gas under pressure within the tube and heating it to a temperature suitable for orientation after its passage through the nip of said first pair of nip rollers, cooling the stretched film thereby produced, collapsing it by the V-section guides and withdrawing the collapsed film through the nip of a second pair of nip rollers.

8. A process according to claim 7 wherein said gas is admitted under pressure through at least one probe passing through the nip of said first pair of nip rollers.

9. A process according to claim 1 wherein the film is of polypropylene.

References Cited by the Examiner
UNITED STATES PATENTS

| | | | |
|---|---|---|---|
| 2,433,937 | 1/48 | Tornberg | 18—145 |
| 2,862,234 | 12/58 | Gerber | 18—57 XR |
| 2,955,321 | 10/60 | Fortner et al. | 18—14 |
| 2,966,700 | 1/61 | Dyer et al. | 18—14 |
| 3,092,874 | 6/63 | Fallwell | 18—57 XR |

ALEXANDER H. BRODMERKEL, *Primary Examiner.*